United States Patent [19]

Gray

[11] Patent Number: 4,545,595
[45] Date of Patent: Oct. 8, 1985

[54] METHOD AND APPARATUS FOR ASSISTING IN AND FACILITATING THE COUPLING OF A TRAILER TONGUE TO A VEHICLE LATCH

[76] Inventor: Joe B. Gray, Coley Trailer Park, P.O. Box 219, Butner, N.C. 27509

[21] Appl. No.: 609,428

[22] Filed: May 11, 1984

[51] Int. Cl.⁴ .............................................. B60S 9/04
[52] U.S. Cl. .................................... 280/477; 254/338
[58] Field of Search .............. 280/477, 478 R, 478 A, 280/478 B, 402; 254/420, 263, 227, 334, 338; D25/67

[56] References Cited

U.S. PATENT DOCUMENTS

| 277,484 | 5/1883 | Hawes | 254/263 |
|---|---|---|---|
| 3,086,752 | 4/1963 | Wetter | 254/420 |
| 3,201,144 | 8/1965 | Smyser | 280/477 |
| 4,186,938 | 2/1980 | Youngblood | 280/402 |

FOREIGN PATENT DOCUMENTS 535721 4/1941 United Kingdom ................ 280/477

Primary Examiner—Joseph F. Peters, Jr.
Assistant Examiner—Everett G. Diederiks, Jr.
Attorney, Agent, or Firm—Mills & Coats

[57] ABSTRACT

The present invention presents a method and apparatus for assisting in and facilitating the coupling of a trailer tongue to a vehicle hitch. An overhead structure extends over the trailer tongue and includes a pulley depending downwardly therefrom. Through the provisions of a winch and an attached cable assembly which is threaded through the pulley and attached to the trailer tongue, the trailer tongue is elevated upwardly and stationed at an elevated position such that the vehicle hitch may be moved thereunder. Once the trailer hitch assumes an appropriate position, then the winch is actuated and the trailer tongue is lowered onto the vehicle hitch and the vehicle hitch is appropriately coupled to the trailer tongue. Moreover, the overhead support structure includes an indicator which assists a vehicle operator in aligning with the trailer tongue and further includes a bumper sensor that projects outwardly from one side of the overhead structure and effectively engages a rear bumper forming a part of the vehicle having the vehicle hitch secured thereon. Upon engaging the bumper sensor with the vehicle, the operator then realizes the relative position of the trailer tongue and the vehicle hitch.

9 Claims, 3 Drawing Figures

METHOD AND APPARATUS FOR ASSISTING IN AND FACILITATING THE COUPLING OF A TRAILER TONGUE TO A VEHICLE LATCH

FIELD OF THE INVENTION

The present invention relates to methods and apparatuses for facilitating the coupling of a trailer tongue with a vehicle hitch.

BACKGROUND OF INVENTION

For those individuals who have experienced coupling a vehicle hitch to a trailer tongue, it is easy to appreciate the problems and frustrations involved in such a process. On the one hand, it is sometimes difficult, especially for the less experienced, to align the vehicle hitch with the trailer tongue while backing the vehicle into a position for coupling the trailer tongue to the vehicle hitch. Next, assuming that the vehicle and trailer tongue are properly aligned, it is often difficult to stop the vehicle at a precise position where the attaching end of the trailer tongue is appropriately positioned to fit over the vehicle hitch.

But assuming that one is able to appropriately align and stop the vehicle, then there is an additional problem. This problem entails having to lift the trailer tongue and place the same over the vehicle hitch. Again this is even more of a problem if the trailer tongue has to be swayed from side to side or the entire trailer moved backward or forward to align the attaching end of the trailer tongue with the vehicle hitch.

The above problems and inconveniences are even more serious for elderly individuals or individuals who cannot lift such weights because of health reasons.

Therefore, there has been and continues to be a need for a system to assist individuals in easily and conveniently attaching a trailer tongue to a vehicle hitch.

SUMMARY AND OBJECTS OF INVENTION

The present invention entails a system for overcoming the problems discussed hereinabove and for assisting in and facilitating the hitching of a trailer tongue to a vehicle hitch. More particularly, the present invention entails an overhead support structure that straddles the trailer tongue and through the provision of a winch and cable assembly the trailer tongue is supported at an appropriate elevated position in order that the vehicle hitch can be moved under the attaching end of the trailer tongue for quick and efficient coupling.

Moreover, the present invention includes bumper guards or sensors that project outwardly to engage the rear bumper of the vehicle including the vehicle hitch. The presence of the bumper guards enables the vehicle operator to appropriately judge the position of the vehicle hitch with respect to the attaching end of the trailer tongue.

In addition the system includes an upstanding indicator or sign that is aligned with the tongue and clearly visible by the operator in order that the operator can appropriately align the vehicle with the trailer tongue.

It is, therefore, an object of the present invention to provide a method and apparatus for facilitating the coupling of a trailer tongue to a vehicle hitch and which enables an individual to make the coupling arrangement without having to manually lift the trailer tongue and adjust its position with respect to the vehicle hitch.

Another object of the present invention resides in the provision of a method and apparatus for facilitating the coupling of a trailer tongue with a vehicle hitch by the provision of an overhead support structure adapted to straddle the trailer tongue which is adapted to be utilized in conjunction with a cable and winch assembly wherein the cable is attached to the trailer tongue and appropriately trained around one or more pulleys that effectively supports the trailer tongue in an elevated position such that the vehicle hitch can be moved thereunder for easy coupling.

It is also an object of the present invention to provide a coupling assist apparatus of the character referred to above that includes bumper guards for engaging the rear bumper of a vehicle during the coupling operation so as to appraise the vehicle operator of the relative position of the vehicle hitch with respect to the attaching end of the trailer tongue.

Still a further object of the present invention resides in the provision of a method and apparatus of the character referred to above that includes an alignment indicator for enabling the vehicle operator to appropriately align the vehicle hitch with the trailer tongue during the coupling operation.

It is also an object of the present invention to provide a method and apparatus of the character referred to above that utilizes a cable and winch assembly to draw and hold the trailer tongue at a selected height wherein the system may include its own cable and winch assembly or in the alternative may utilize a cable and winch assembly provided about the trailer or the trailer tongue, such is the case with a boat trailer.

Also an object of the present invention resides in the provision of a system for straddling and supporting a trailer tongue at a selected height wherein the support structure straddling the trailer tongue is simple in construction but yet strong and rugged.

Other objects and advantages of the present invention will become apparent from a study of the following description and the accompanying drawings which are merely illustrative of the present invention.

METHOD AND APPARATUS FOR FACILITATING THE COUPLING OF A TRAILER TONGUE TO A VEHICLE HITCH

With further reference to the drawings, an apparatus is shown therein and indicated generally by the numeral 10. Apparatus 10 is designed to assist in and facilitate the coupling of a trailer tongue to a vehicle hitch.

Figure 1:
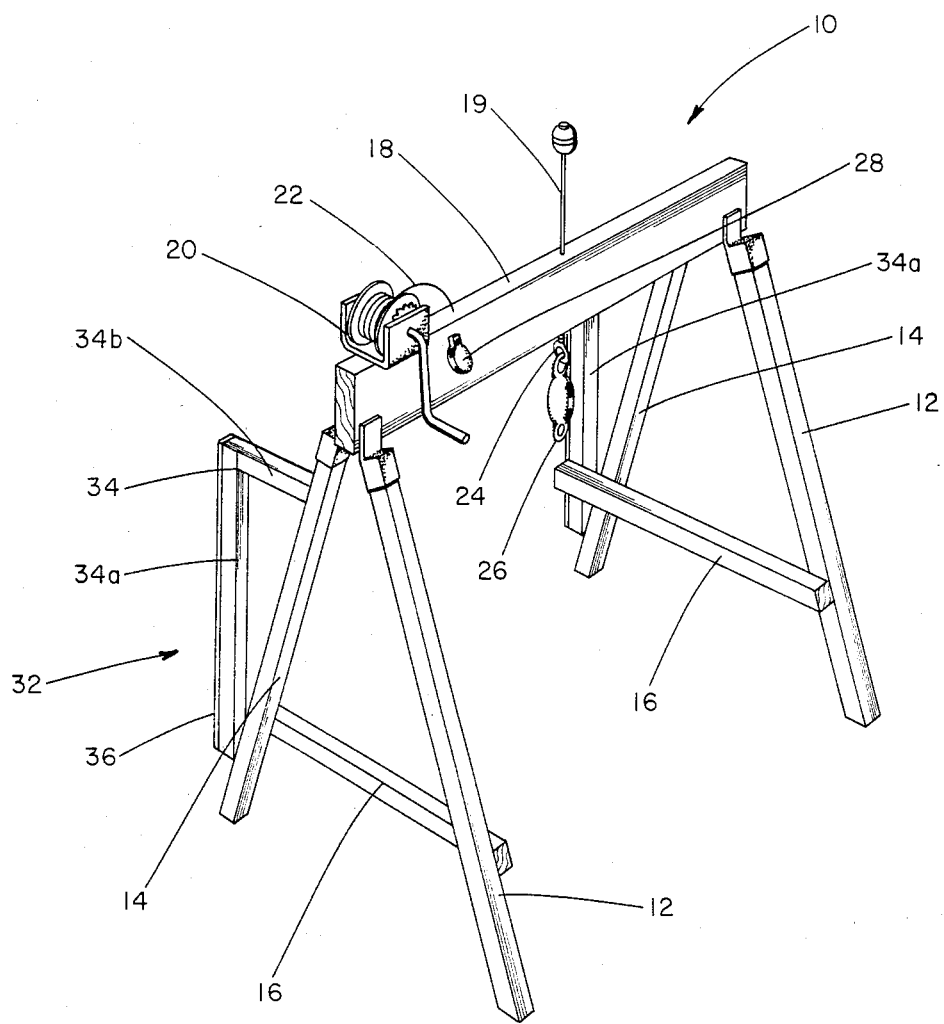
FIG. 1 is a perspective view of the apparatus of the present invention particularly illustrating the overhead support structure that is designed to straddle a trailer tongue.
Figure 2:
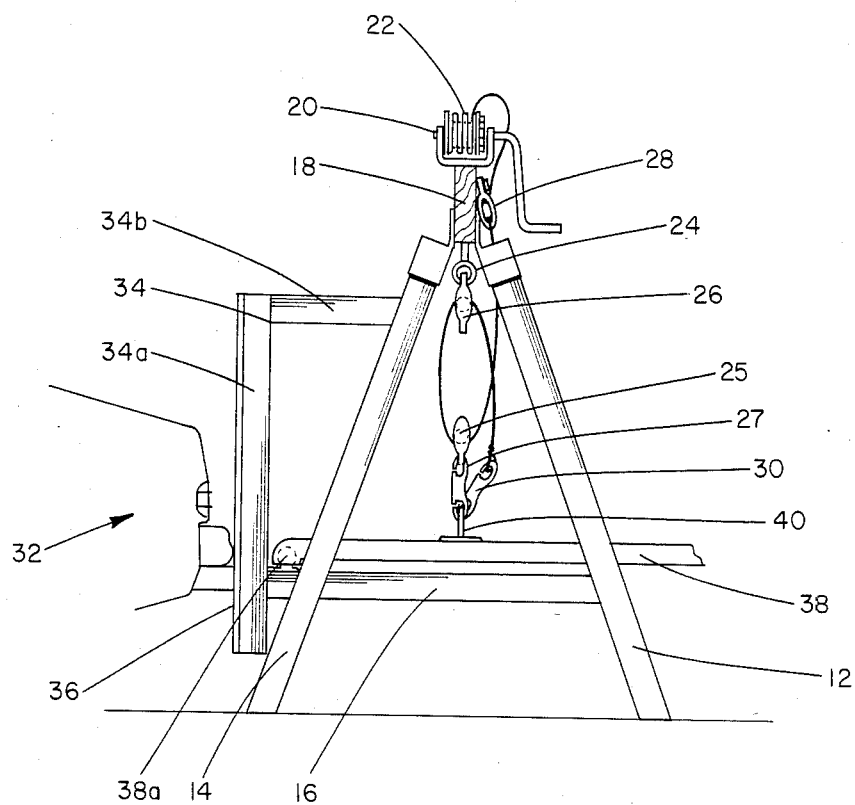
FIG. 2 is a side elevational view of the overhead support structure illustrating the same supporting a trailer tongue in an elevated position.
Figure 3:
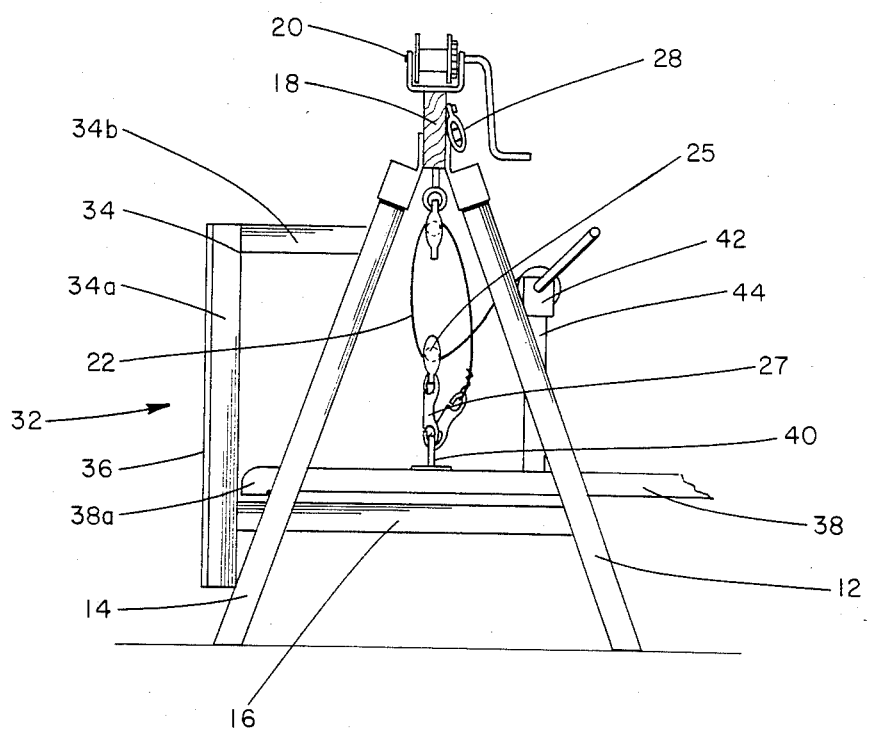
FIG. 3 is a side elevational view of the overhead support structure similar to FIG. 2 with the exception that the winch and cable assembly being utilized is a cable and winch assembly forming a part of the trailer being coupled.

Apparatus 10 is specifically shown in FIG. 1 and includes an overhead support structure that is designed to straddle the trailer tongue, such as illustrated in FIGS. 2 and 3. Viewing apparatus 10 in detail, it is seen that the same includes a pair of laterally spaced vertical end support assemblies that include a pair of legs 12 and 14 that extend upwardly and inwardly from the ground or other support area. Secured transversely across legs 12 and 14 is a cross member 16.

Extending between the vertical end support assemblies and connected to each is a transverse header 18. It is seen that the structure just described forms a sawhorse type structure.

Secured to the top of header 18 is a winch assembly 20 that includes a cable 22 secured thereto. Cable 22 includes a remote terminal end that is adapted to receive and attach to a clip 30.

Secured to the underside of header 18, approximately midway between the ends of apparatus 10 is an eyelet 24. Secured to eyelet 24 is a pulley tackle 26.

Also attached to the side of header 18 is a guide pulley tackle 28.

As viewed in FIGS. 2 and 3, the right side of apparatus 10 is referred to as the trailer facing side while the left side is the vehicle facing side as that side generally faces the coupling vehicle.

Secured to apparatus 10 about the vehicle facing side is a pair of bumper sensors or guards, indicated generally by the numeral 32. Each bumper sensor 32 comprises a generally inverted L-shaped assembly 34 that is secured to respective legs 14 and project outwardly therefrom. It is noted that each inverted L-shaped assembly 34 includes a vertical leg 34a and a horizontal leg 34b. Vertical leg 34a is secured to an extended portion of cross member 16 while horizontal leg 34b is attached to leg 14. Secured about the outer edge of vertical leg 34a is a resilient padding 36.

As particularly illustrated in FIGS. 2 and 3, apparatus 10 of the present invention defines a trailer tongue receiving area generally between the respective vertical end support assemblies and underneath header 18. As seen in FIGS. 2 and 3, a trailer tongue 38 is shown and includes a forward coupling end 38a. Secured on top of tongue 38 is an attaching ring 40. As illustrated in FIG. 3, tongue 38 is of the type associated with a boat trailer and includes an upstanding post 44 that includes a conventional winch 42 mounted thereto.

In operation apparatus 10 is positioned over trailer tongue 38 so as to straddle the same, as particularly illustrated in FIGS. 2 and 3. First, with respect to FIG. 2, cable 22 is threaded through aligning pulley tackle 28 and is then trained around a lower disposed pulley tackle 25 after which the cable is then trained back around pulley tackle 26. After this, attaching clip 30 is secured to the remote end of cable 22 and the attaching clip 30 is then secured to the attaching ring 40 of tongue 38. Secured to intermediate pulley 25 is a second attaching clip 27 that is also secured to attaching ring 40 of trailer 38.

Next winch 20 is actuated so as to wind cable 22 therearound. In this process it is appreciated that the mechanical cable attachment illustrated in FIG. 2 will result in trailer tongue 38 being lifted and elevated. Once trailer tongue 38 is elevated to a selected height, it is appreciated that winch 20 can be latched so as to hold trailer tongue 38 in that selected elevated position.

With reference to FIG. 3, apparatus 10 of the present invention is utilized just as described above and as shown in FIG. 2 except in this case the winch and cable utilized are secured to the trailer tongue or to the boat trailer associated therewith. As seen in FIG. 3, cable 22 extended from winch 42 is essentially threaded in the same manner as illustrated and discussed hereinabove. In this case it is appreciated that apparatus 10 simply utilizes the winch 42 and associated cable 22 of the trailer associated with tongue 38.

As seen in FIG. 1, secured to the upper portion of header 18 is an indicator 19. Indicator 19 illustrated herein can be constructed of a generally semi-rigid but flexible material, with a ball or flag secured to the upper end thereof. Indicator 19 is generally aligned with pulley tackle 26 such that the same would assume an aligned position with trailer tongue 38. Therefore, as a vehicle is being backed into position for coupling with trailer tongue 38, the operator of that vehicle can use indicator 19 to align a vehicle hitch associated with the vehicle with the trailer tongue.

In addition as the operator of the attaching vehicle backs toward trailer tongue 38, it is appreciated that the rear bumper of the vehicle will engage bumper guards or sensors 32. Once the vehicle operator senses that the bumper sensors 32 have been engaged, he or she will then appreciate the relative position of the vehicle hitch with respect to the attaching end 38a of the trailer tongue 38. This greatly assists the operator in determining precisely where to stop the vehicle in order that the attaching end 38a of the tongue 38 will be appropriately aligned with the vehicle hitch in order that the trailer tongue will not have to be moved substantially in order to complete the coupling operation.

It is appreciated that the operator should be able to back the attaching vehicle to a point where the vehicle hitch underlies the attaching end 38a of the trailer tongue 38. At this point the winch, either 20 or 42, can be actuated so as to effectively lower the trailer tongue 38 to a point where the attaching end 38a rests on the vehicle hitch at which point the final coupling operation can be completed.

From the foregoing specification and discussion, it is seen that the present invention presents a very useful method and apparatus for facilitating the coupling of a trailer tongue to a vehicle hitch. The structure utilized is relatively simple, can be easily handled, but is both sturdy and strong in order that the same can support a trailer tongue of a trailer.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An apparatus for assisting in and facilitating the hitching of a trailer to a vehicle wherein the trailer includes a tongue having a hitching end and wherein the vehicle includes a hitch extending rearwardly from a rear bumper, said apparatus comprising:

A. an overhead tongue support structure, independent of said trailer and vehicle, straddling said tongue for engaging and supporting said tongue a selected height above an underlying support area;

B. said overhead tongue support structure having a vehicle facing side and a trailer facing side and including a pair of laterally spaced vertical end support assemblies that extend upwardly from an underlying support area and a transverse tongue support header extending between upper portions of said vertical end support assemblies so as to define a tongue receiving area beneath said header and between said vertical end support assemblies;

C. a winch mounted on said header;

D. cable means connected to said winch and extending therefrom;

E. pulley means secured to said transverse header and depending downwardly therefrom;

F. said cable extending from said winch being trained around said pulley means and including attaching means formed thereon for attaching to said trailer tongue such that by winding said winch said tongue can be pulled to a selected height under said header and supported thereat such that said vehicle hitch can be conveniently positioned thereunder for easy coupling;

G. bumper engaging means mounted to the vehicle facing side of said overhead tongue support structure for engaging and sensing the presence of the rear bumper of the vehicle as the same is backed into a hitching relationship with said tongue so as to appraise the operator of the relative position of the vehicle hitch with respect to the hitching end of said tongue; and H. an aligning indicator secured to said header and extending upwardly therefrom for assisting the vehicle operator in aligning the vehicle and hitch thereof with said trailer tongue as the vehicle is backed to a position for coupling a trailer tongue to said hitch.

2. The apparatus for assisting in and facilitating the hitching of a trailer to a vehicle of claim 1 wherein said overhead tongue support structure is of a sawhorse design and wherein each vertical end support assembly includes a pair of legs that extend upwardly and inwardly towards said header; and wherein said bumper sensor includes a pair of inverted L-shaped bumper arms that project outwardly from the vehicle facing side of said overhead tongue support structure, and wherein each inverted L-shaped arm includes a resilient padding structure secured to the outer side thereof.

3. The apparatus of claim 2 wherein each vertical end support assembly includes a cross member secured between the pair of legs forming each, and wherein said cross member extends outwardly therefrom where the same is connected to and supports at least a part of said inverted L-shaped bumper arms.

4. An independent and self-standing trailer hitch assist for adjustably supporting a trailer tongue at a selected height above the ground or underlying support area for facilitating the coupling of a trailer hitch on a vehicle with the trailer tongue, said trailer hitch assist comprising: an independent and self-standing overhead support structure for straddling and extending over said trailer tongue and including a pair of laterally spaced vertical end support assemblies joined about upper portions thereof by a transverse header that extends over said trailer tongue; said overhead support structure defining an area underneath said header and between said vertical end support assemblies for receiving a trailer tongue and wherein, when received, the trailer tongue projects underneath and through said overhead support structure; and pulley means supported by said overhead support structure and depending downwardly therefrom, said pulley means being adapted to receive a cable assembly that is normally trained around said pulley means and directed downwardly therefrom to where the same is attached to the trailer tongue such that as said cable assembly is pulled upwardly with respect to said pulley means, said overhead support structure and pulley means function to support said trailer tongue in an elevated position above the underlying ground or support area, whereby the coupling of said trailer tongue to a vehicle hitch is facilitated in that the vehicle trailer hitch can be positioned below the trailer tongue during the coupling process.

5. The trailer hitch assist of claim 4 wherein there is provided bumper guard means secured to said overhead support structure and projecting outwardly therefrom about the side of said overhead support structure that normally faces the vehicle as the same is being backed into a hitching relationship with said trailer tongue, and wherein said bumper sensor means provides an indicator to the operator of the relative relationship between the vehicle hitch and the trailer tongue as the vehicle engages said bumper sensors.

6. The trailer hitch assist of claim 5 further including an alignment indicator secured to said header and extending upwardly therefrom with said alignment indicator being specifically aligned with said pulley means such that said alignment indicator can be utilized by a vehicle operator in the coupling process to appropriately align the vehicle trailer hitch with said trailer tongue.

7. A method of supporting a trailer tongue in an elevated position and for facilitating the hitching of the trailer tongue to a vehicle hitch comprising the steps of:

A. straddling the trailer tongue with an overhead support structure;

B. attaching a pulley to said overhead support structure and extending the pulley downwardly from said overhead support structure;

C. pulling a cable segment from a winch;

D. threading that cable segment through said pulley;

E. directing the cable segment downwardly from the pulley to the underlying trailer tongue;

F. attaching the cable segment below the pulley to the trailer tongue;

G. winding the winch so as to pull and elevate the trailer tongue towards said pulley;

H. locking the winch once the trailer tongue has been raised and elevated to a selected height and supporting the trailer tongue at that selected height;

I. moving a vehicle hitch to an appropriate coupling position below the trailer tongue;

J. lowering the trailer tongue onto said vehicle hitch by releasing said winch and allowing the cable to move downwardly from the pulley;

K. coupling the trailer tongue to the vehicle hitch; and

L. disconnecting the cable segment from the trailer tongue.

8. The method of claim 7 further including the step of projecting one or more bumper sensors from said overhead support structure; and engaging the bumper of said vehicle having said vehicle hitch thereon with said bumper sensors so as to effectively appraise the vehicle operator of the position of said vehicle hitch with respect to the trailer tongue.

9. The method of claim 7 including the step of unwinding a cable assembly from a winch mounted on the trailer tongue and threading that cable through said pulley depending from said overhead support structure.

* * * * *